(12) United States Patent
Lee (10) Patent No.: US 10,923,979 B2
(45) Date of Patent: Feb. 16, 2021

(54) INSULATOR AND MOTOR INCLUDE SAME

(71) Applicant: LG INNOTEK CO., LTD., Seoul (KR)

(72) Inventor: Hae Seok Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 437 days.

(21) Appl. No.: 16/061,902

(22) PCT Filed: Dec. 14, 2016

(86) PCT No.: PCT/KR2016/014620
§ 371 (c)(1),
(2) Date: Jun. 13, 2018

(87) PCT Pub. No.: WO2017/105068
PCT Pub. Date: Jun. 22, 2017

(65) Prior Publication Data
US 2018/0375398 A1 Dec. 27, 2018

(30) Foreign Application Priority Data

Dec. 15, 2015 (KR) .................. 10-2015-0179504

(51) Int. Cl.
*H02K 3/34* (2006.01)
*H02K 3/52* (2006.01)
(Continued)

(52) U.S. Cl.
CPC ............. *H02K 3/345* (2013.01); *H02K 3/522* (2013.01); *H02K 3/22* (2013.01); *H02K 3/28* (2013.01);
(Continued)

(58) Field of Classification Search
CPC .. H02K 3/22; H02K 3/28; H02K 3/34; H02K 3/345; H02K 3/522
See application file for complete search history.

(56) References Cited

U.S. PATENT DOCUMENTS 8,593,031 B2 * 11/2013 Kinugawa ................ H02K 3/18
310/208
2006/0022550 A1 * 2/2006 Otsuji .................... H02K 3/325
310/194

(Continued)

FOREIGN PATENT DOCUMENTS

CN 102986120 A 3/2013
CN 204538841 U 8/2015
(Continued)

OTHER PUBLICATIONS

Office Action dated Sep. 3, 2019 in Chinese Application No. 201680073143.2.
(Continued)

*Primary Examiner* — Nguyen Tran
(74) *Attorney, Agent, or Firm* — Saliwanchik, Lloyd & Eisenschenk (57) ABSTRACT

The present invention provides an insulator which comprises: an inner guide; an outer guide; and a body connecting the inner guide and the outer guide, and having a coil wound thereon, wherein a rotatable wing is connected to an outer surface of the outer guide.

12 Claims, 7 Drawing Sheets

(51) Int. Cl.
      *H02K 3/28*           (2006.01)
      *H02K 3/22*           (2006.01)
      *H02K 15/10*         (2006.01)

(52) U.S. Cl.
      CPC ......... *H02K 15/10* (2013.01); *H02K 2203/06* (2013.01); *H02K 2203/09* (2013.01)

(56) References Cited

U.S. PATENT DOCUMENTS

2013/0115064 A1\*   5/2013   Kimura .................. F01D 25/08
                                                                    415/177
2014/0084740 A1     3/2014   Carpenter et al.

FOREIGN PATENT DOCUMENTS

| JP | 11-122855 A | 4/1999 |
| JP | 11-136885 A | 5/1999 |
| JP | 2010-110048 A | 5/2010 |
| JP | 2010-161892 A | 7/2010 |
| KR | 10-2013-0057149 A | 5/2013 |

OTHER PUBLICATIONS

International Search Report in International Application No. PCT/KR2016/014620, filed Dec. 14, 2016.

\* cited by examiner

INSULATOR AND MOTOR INCLUDE SAME

CROSS-REFERENCE TO RELATED APPLICATIONS

This application is the U.S. national stage application of International Patent Application No. PCT/KR2016/014620, filed Dec. 14, 2016, which claims priority to Korean Application No. 10-2015-0179504, filed Dec. 15, 2015, the disclosures of each of which are incorporated herein by reference in their entirety.

TECHNICAL FIELD

The present invention relates to an insulator including a wing and a motor including the same.

BACKGROUND ART

Generally, an electronic power steering system (EPS) is an apparatus for ensuring vehicle steering stability by providing power in a direction in which a driver steers using a motor so as to facilitate handling.

Unlike a hydraulic power steering (HPS), the EPS may control operation of the motor according to traveling conditions to improve a steering performance and a steering sensation.

Specifically, in the EPS, an electronic control unit (ECU) controls an inverter to drive the motor according to the traveling condition detected by a speed sensor, a torque angle sensor, a torque sensor, and the like. Accordingly, by ensuring turning stability and providing a rapid restoring force, the driver may safely drive.

In a motor used in the above-described EPS, an insulator is inserted into the motor for insulation of a stator core, which is a basic component of the motor, and ends of coils are connected to terminals.

However, in the case in which the ends of the coils are connected to the terminals, the connections may be restricted by the volume of the motor, and a short circuit problem may occur in the case in which interference occurs between the coils.

In addition, since separate parts are needed to solve the problem, there may be a problem in that process cost and material cost increase.

DISCLOSURE

Technical Problem

The present invention is directed to solving an interference problem between coils when the coils are wound around a core.

In addition, the present invention is directed to improving a space factor by providing an integrated insulator.

Objectives solved by the present invention are not limited to the above-described objectives, and other objectives, which are not described above, may be clearly understood by those skilled in the art through the following specification.

Technical Solution

One aspect of the present invention provides an insulator including: an inner guide; an outer guide; and a body which connects the inner guide and the outer guide and on which a coil is wound, wherein a wing which is rotatable is connected to an outer surface of the outer guide.

The wing and another wing adjacent to the wing may be connected to a connecting part.

The plurality of wings and the connecting part may be integrally injection-molded.

A notch may be formed in the connecting part.

The connecting part may have a lower height than the wing.

A plurality of guide grooves for guiding the coil may be formed in the outer surface of the outer guide.

The wing may have a height enough to cover the plurality of guide grooves.

A busbar connecting part connected to a busbar may be formed on the wing.

A busbar connecting part may include a groove into which a busbar is inserted.

A busbar connecting part may be formed on at least one of the plurality of wings.

Among the plurality of wings, a thickness of the wing on which the busbar connecting part is formed may be greater than that of the wing in which the busbar connecting part is not formed.

The outer guide and an outer guide adjacent to the outer guide may be connected by a connecting part.

A notch may be formed in the connecting part.

Another aspect of the present invention provides a motor including: a stator on which a coil is wound; a rotor disposed inside the stator; a rotational shaft coupled to the rotor; and an insulator located between the coil and the stator and including an outer circumferential surface on which the coil is wound, wherein the insulator includes an inner guide, an outer guide, and a body configured to connect the inner guide and the outer guide, and a wing which is rotatable is connected to an outer surface of the outer guide.

In the insulator, the wing and another wing adjacent to the wing may be connected by a connecting part.

In the insulator, the plurality of wings and the connecting part may be integrally formed.

In the insulator, a plurality of guide grooves for guiding the coil may be formed in the outer surface of the outer guide.

The wing may include a busbar connecting part connected to a busbar.

At least one of the plurality of wings may be provided with a busbar connecting part connected to a busbar.

The outer guide and an outer guide adjacent to the outer guide may be connected by a connecting part.

Advantageous Effects

As described above, in a case in which coils are wound around outer shells of insulators, interference between the coils can be inhibited.

In addition, there is an effect in that the insulator is integrally formed to improve a space factor of the coils.

Various useful advantages and effects may not be limited to the above-described effects, and may be more easily understood through a process in which specific embodiments of the present invention are described.

MODES OF THE INVENTION

While the present invention may be modified in various ways and take on various alternative forms, specific embodiments thereof are shown in the drawings and described in detail below. However, it should be understood that there is no intent to limit the present invention to the particular forms disclosed, but on the contrary, the present invention covers all modifications, equivalents, and alternatives falling within the spirit and scope of the present invention.

It will be understood that, although the terms "first," "second," etc. may be used herein to describe various elements, these elements should not be limited by these terms. These terms are only used to distinguish one element from another. For example, a first element could be termed a second element, and a second element could similarly be termed a first element without departing from the scope of the present invention. As used herein, the term "and/or" includes any and all combinations of one or more of the associated listed items.

The terminology used herein to describe embodiments of the present invention is not intended to limit the scope of the present invention. The articles "a," and "an" are singular in that they have a single referent, however the use of the singular form in the present document should not preclude the presence of more than one referent. In other words, elements of the present invention referred to in the singular may number one or more, unless the context clearly indicates otherwise. It will be further understood that the terms "comprise," "comprising," "include," and/or "including," when used herein, specify the presence of stated features, numbers, steps, operations, elements, and/or components but do not preclude the presence or addition of one or more other features, numbers, steps, operations, elements, components, and/or groups thereof.

In a description of the embodiment, in a case in which any one element is described as being formed on (or under) another element, such a description includes both a case in which the two elements are formed to be in direct contact with each other and a case in which the two elements are in indirect contact with each other such that one or more other elements are interposed between the two elements. In addition, when in a case in which one element is described as being formed on (or under) another element, such a description may include a case in which the one element is formed at an upper side or a lower side with respect to the another element.

Hereinafter, the exemplary embodiments of the present invention will be described in detail with reference to the accompanying drawings. The same or corresponding elements will be consistently denoted by the same respective reference numerals and described in detail no more than once regardless of drawing symbols.

FIGS. 1 to 6 clearly show main portions to conceptually and clearly understand the present invention, various modifications of the drawings are accordingly predicted, and a scope of the present invention need not be restricted by specific shapes illustrated in the drawings.

Figure 1:
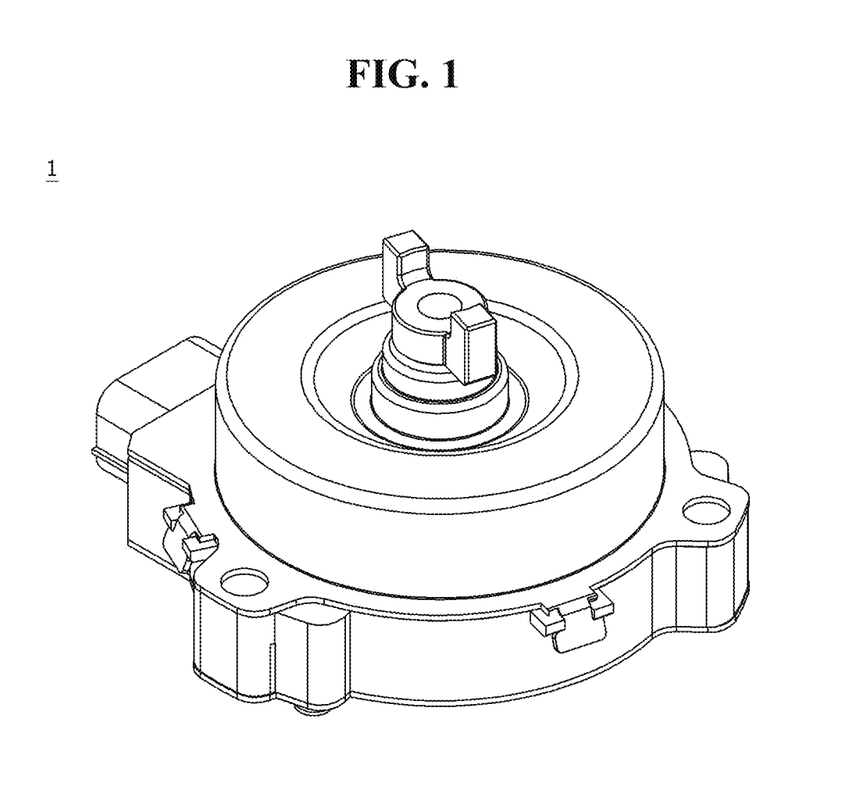
FIG. 1 is a perspective view illustrating a motor according to one embodiment of the present invention.
Figure 2:
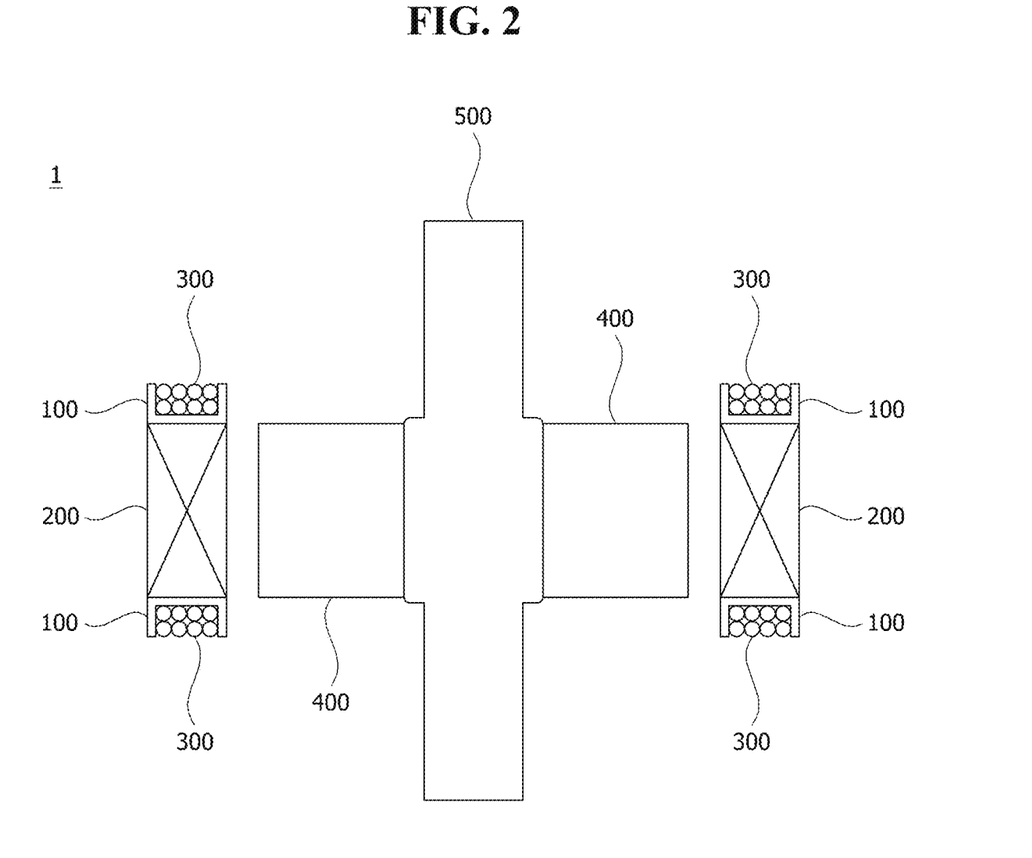
FIG. 2 is a cross-sectional view of the motor illustrated in FIG. 1.

FIG. 1 is a perspective view illustrating a motor according to an embodiment of the present invention, and FIG. 2 is a schematic cross-sectional view illustrating the motor according to the embodiment of the present invention. The cross-sectional view of FIG. 2 is for describing overall components and locations.

Referring to FIGS. 1 and 2, a motor 1 may include a stator 200 on which coils 300 are wound, a rotor 400 disposed inside the stator 200, a rotational shaft 500 coupled to the rotor 400, and insulators 100 located between the coils 300 and the stator 200 and having outer circumferential surfaces on which the coils 300 are wound.

The insulators 100 serve to insulate the coils 300 from the stator 200 so that a current does not flow therebetween. The insulator 100 may be formed of a resin material. The insulator 100 will be described below.

The stator 200 may be formed by stacking a plurality of steel plates including ring-shaped yoke portions and tooth portions disposed in a circumferential direction, protruding inward from yokes in a diameter direction, and spaced an equiangular interval from each other. The coils configured to generate rotating magnetic fields may be wound around teeth. Here, the stator 200 and the coils 300 may be insulated by the insulators 100.

The rotor 400 is disposed inside the stator 200. The rotor 400 may be formed by coupling a magnet to a rotor core, and in some cases, the rotor core and the magnet may also be integrally formed. In addition, the rotor 400 may be formed by coupling the magnet to an outer circumferential surface of the rotor core, or by inserting the magnet into a pocket of the rotor core. A sensing magnet (not shown) for obtaining rotor position information may be installed by being coupled to a plate above the rotor 400, or a rotor position detection unit similar to the sensing magnet may be installed in the motor.

When a current is supplied to the coil 300 wound around the stator 200, an electrical interaction is induced between the coil and the rotor 400, and rotation of the rotor 400 is induced. When the rotor 400 rotates, the rotational shaft 500 rotates to provide power.

Figure 3:
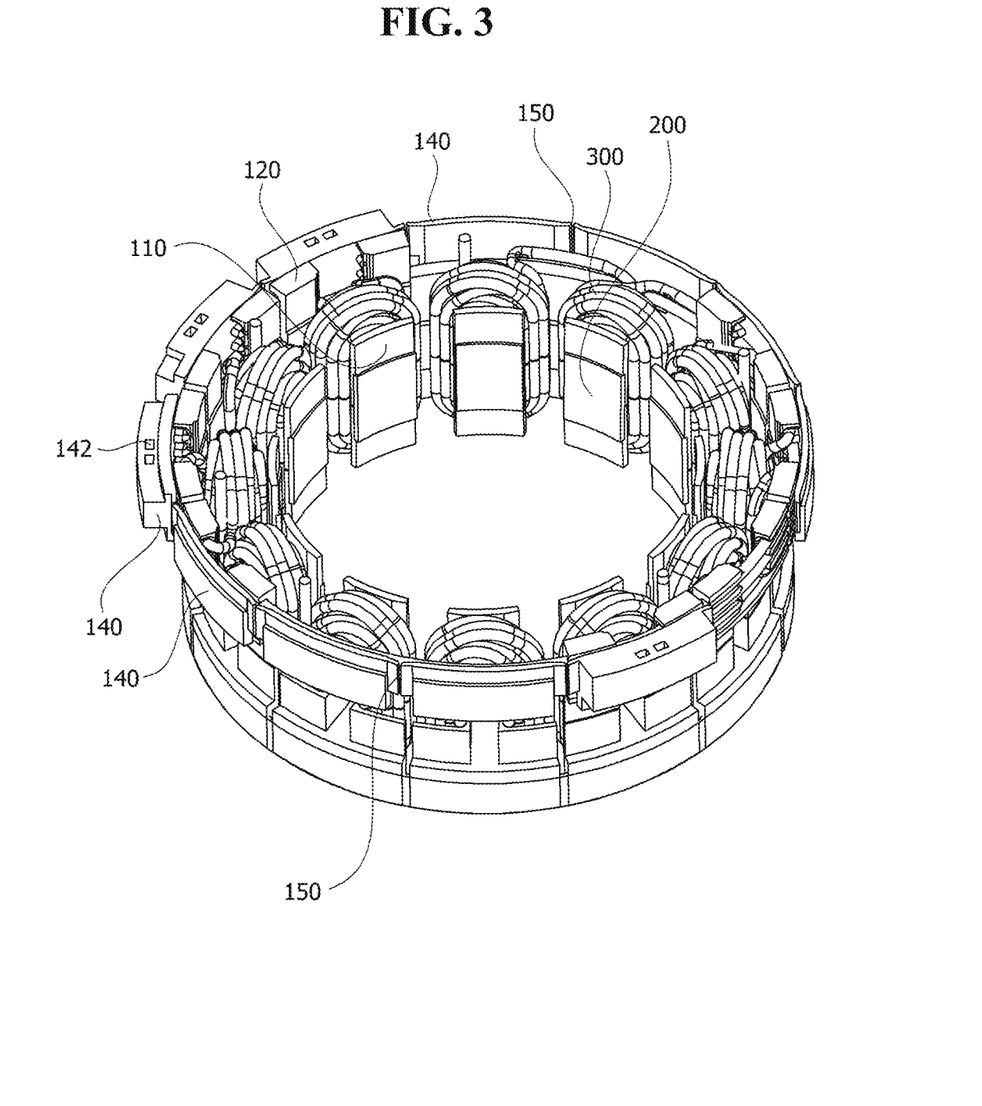
FIG. 3 is a view illustrating a shape of a stator which is a component of the motor illustrated in FIG. 1.
Figure 4:
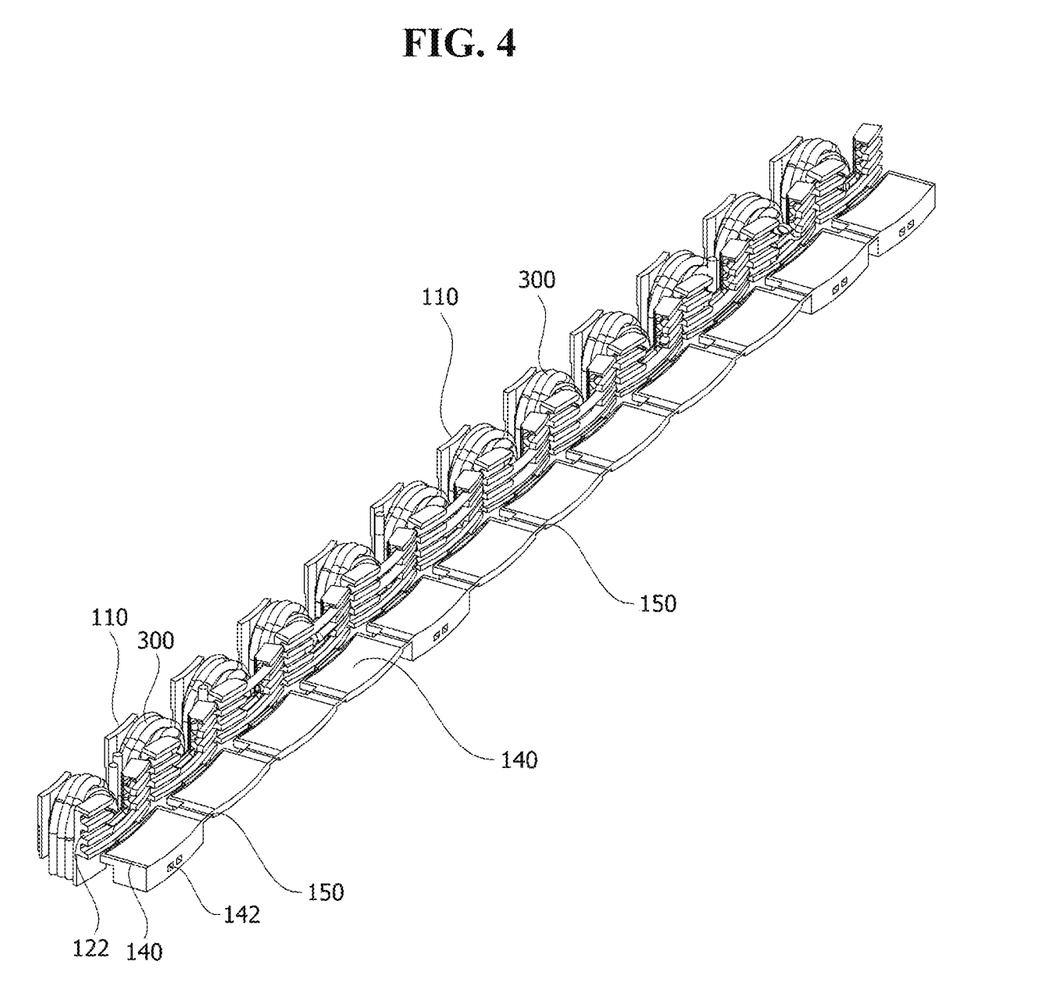
FIG. 4 is a view illustrating a spread state of the stator illustrated in FIG. 3.
Figure 5:
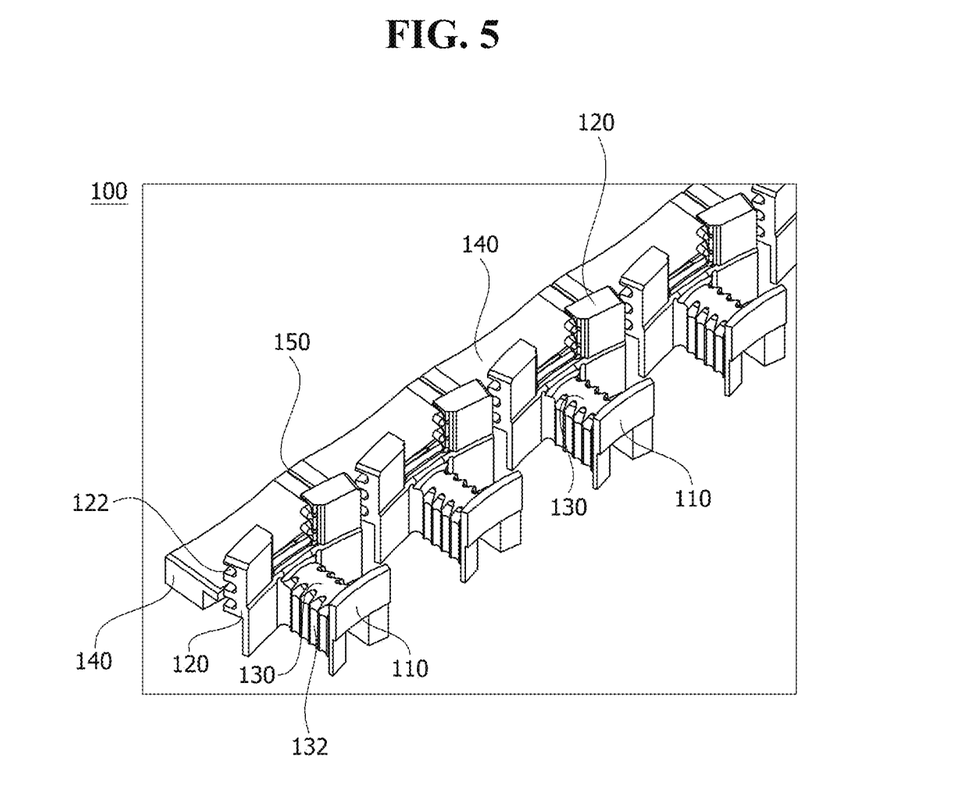
FIG. 5 is a view illustrating an insulator which is a component of the stator illustrated in FIG. 3

FIG. 3 is a view illustrating a shape of a stator which is a component of the motor, FIG. 4 is a view illustrating a spread state of the stator, and FIG. 5 is a view illustrating an insulator which is a component of the present invention.

Referring to FIGS. 3 to 5, the insulators 100 may include inner guides 110, outer guides 120, bodies 130, and wings 140.

The insulators 100 form an inner space for accommodating the stator 200 and serve to block contacts between the coils 300 and the stator 200 when the coils 300 are wound around the outer circumferential surface to insulate the coils 300 from the stator 200 so that a current does not flow therebetween.

The plurality of insulators 100 may be provided and coupled to the stator 200, and as one example, the insulators 100 may be coupled to upper and lower portions of the stator 200. In addition, the insulators 100 may be integrally formed, the stator 200 may be inserted into the insulators 100, and therefore a coupling structure of the insulators 100 may be variously modified.

The inner guides 110 may be located to face the rotor 400 disposed inside the inner guide 110, and may have a predetermined curvature. The inner guides 110 may have an inner space for accommodating the stator 200, and a shape of the inner space may be modified to various shapes for accommodating the stator 200.

The outer guides 120 may be located to face a housing (not shown) of the motor 1, and may have a predetermined curvature. The outer guides 120 also have an inner space for accommodating the stator 200, and a shape of the inner space may be modified to various shapes to accommodate the stator 200.

The bodies 130 insulate the stator 200 and the coils 300 and connect the outer guides 120 and inner guides 110. A plurality of alignment grooves 132 may be formed in the body 130 to align the coil 300 in a case in which the coil 300 is wound around the body 130. A width or the number of the alignment grooves 132 may be changed according to a size of the motor 1 or stator 200, and a shape of the alignment groove 132 may be variously modified to align the coil 300.

Heights of the inner guide 110 and the outer guide 120 may be greater than that of the body 130. The coil 300 may be wound around the body 130 to have a plurality of layers. The coil 300 may be guided by the alignment grooves 132 in the case of a lowermost layer, but since there is a risk that the coil may escape from the body in the case of upper layers, the inner guide 110 and the outer guide 120 may be formed to be higher than the body 130 to inhibit the escape of the coil 300. In addition, in order to inhibit the escape of the coil 300, widths of the inner guide 110 and the outer guide 120 may be greater than that of the body 130.

As described above, the inner guide 110, the outer guide 120, and the body 130 included in the insulator 100 may inhibit contacts between the coil 300 and the stator 200.

The wings 140 may be rotatably connected to outer surfaces of the outer guides 120. Generally, the coils 300 are wound around the insulators 100, the coils 300 are collected, and the coils 300 are connected to terminals. In a case in which ends of the coils 300 are connected to the terminals, the coils 300 need to be arranged, and the coils 300 are connected to the terminals in the provided spaces through various methods. When the ends of the coils 300 of each phase are located far away, the coils 300 are wound around outer shells of the insulators 100. In the case in which the coils 300 are connected to the terminals in outer spaces of the insulators 100, the connections are restricted by the outer spaces for connecting the coils 300 to the terminals. However, the wings 140 of the outer guides 120 may rotate to cover the coils 300 after the coils 300 are arranged. The wings 140 may serve to insulate the coils 300 arranged outside the insulators 100.

A plurality of guide grooves 122 for guiding the coils 300 arranged on the outer surfaces may be formed in the outer guides 120. The outer guide 120 may have a slim structure to reduce material cost, and after the coils 300 are inserted into the guide grooves 122, the wings 140 may be pressed against the coils 300. The wing 140 may have a height to cover all the guide grooves 122. As an example, the outer guide 120 may include three guide grooves 122 to guide three phase lines.

In the plurality of insulators 100 inserted into the motor 1, the adjacent wings 140 may be connected by connecting parts 150. In this case, the connecting parts 150 configured to connect a plurality of wings 140 may be integrally connected to the insulators 100. In a case in which the insulators 100 are injection-molded as described above, a winding operation may be performed in a state in which the stator 200 is spread, and there is an effect in that the winding operation is simplified when the winding operation is performed in a state in which the stator 200 is spread in a line shape because distances between slots are long. Here, there is an effect in that a space factor is improved when the number of windings around the stator 200 is increased.

A notch may be formed in the connecting part 150 to facilitate rotation of the integrated insulator 100 after the winding operation. In addition, the connecting part 150 may have a height lower than that of the wing 140 to facilitate the rotation of the insulator 100.

As described above, the plurality of wings 140 are integrally connected to the connecting parts 150, the coils 300 are wound, and the plurality of wings 140 are rotated and folded toward the outer guide 120. Then, a user may assemble the stator 200 in a cylindrical shape by rolling all the insulators 100. In the integrated insulators 100, the wings 140 are not necessarily connected by the connecting parts 150, the outer guides 120 may have an integrated structure by being connected to the connecting parts. Features of a structure of the connecting parts 150 for connecting the wings 140 may be applied to all of the connecting parts for connecting the outer guides 120.

Busbar connecting parts 142 connected to busbars may be formed in the wings 140. The busbars are for connecting the coils disposed in parallel and are electrically connected to the coils. A kind or shape of the busbar is not limited, and may be variously modified.

As one example, the busbar connecting part 142 may be formed in an upper surface of the wing 140 when the wing 140 rotates toward the outer guide 120, and a groove into which the busbar is inserted may be formed. The busbar may have a protrusion to be inserted into the busbar connecting part 142, and a location of the groove and a location of the connecting part may be switched.

In addition, in a case in which the insulators 100 are formed integrally, the busbar connecting part 142 may be formed on at least one of the plurality of wings 140. The thickness of the wing 140 in which the busbar connecting part 142 is formed may be greater than that of the wing 140 in which the busbar connecting part 142 is not formed so as to support the busbar. Since the busbar connecting parts 142 do not need to be formed in all of the wings 140 to fix the busbars, there is an effect in that cost is reduced by forming the busbar connecting parts 142 only at necessary locations.

Figure 6:
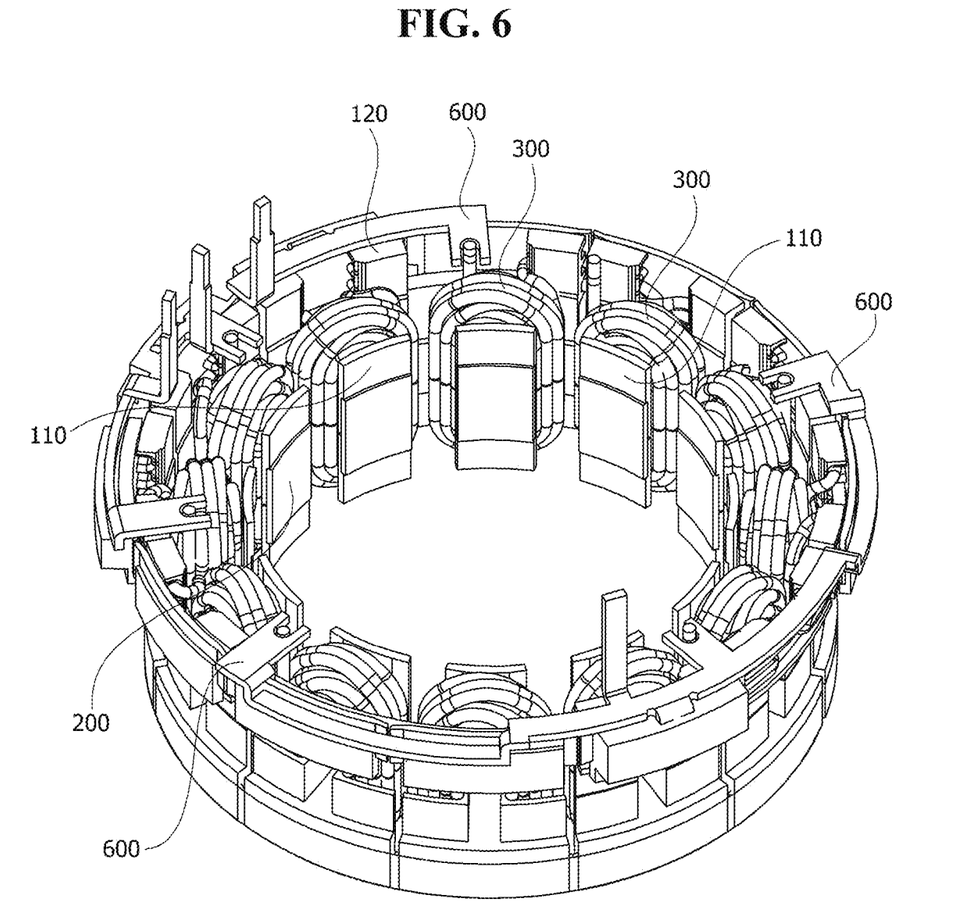
FIG. 6 is a view illustrating a state in which a busbar is connected to the stator illustrated in FIG. 3.
Figure 7:
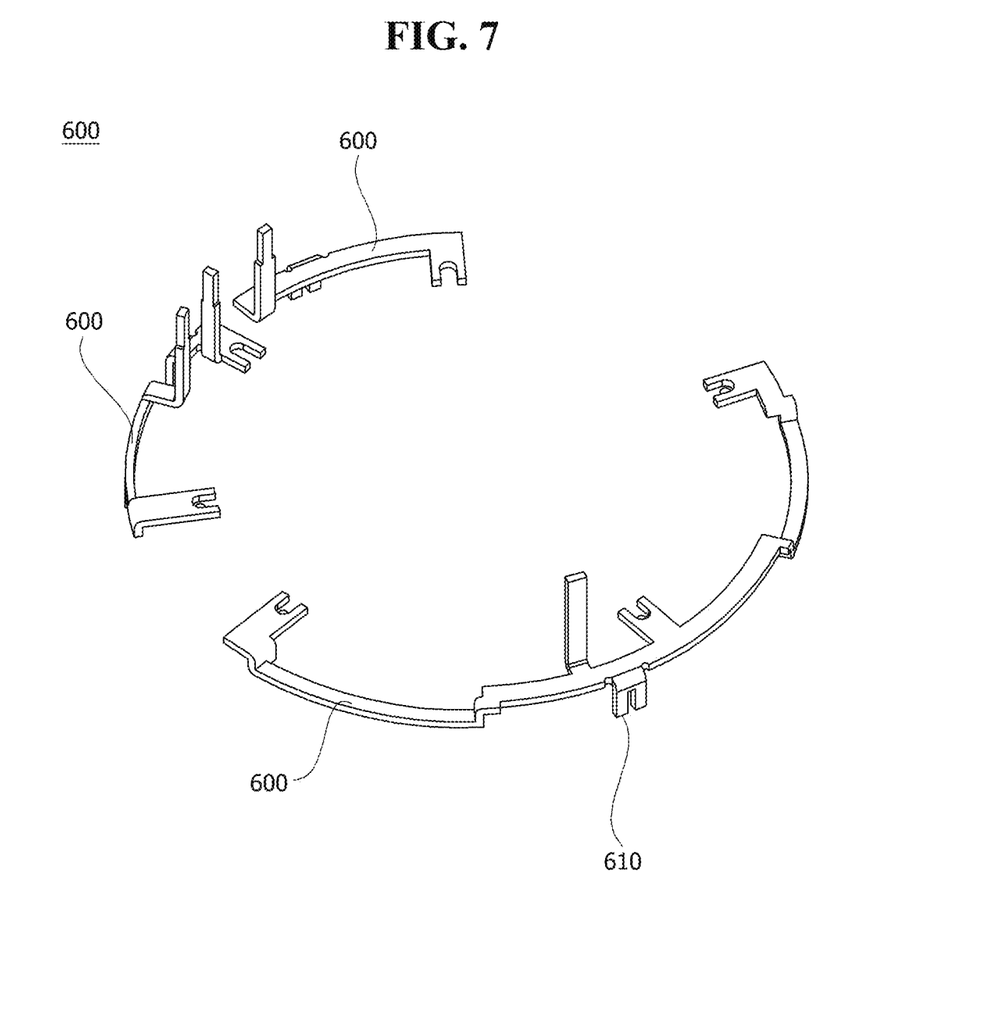
FIG. 7 is a view illustrating a shape of the busbar illustrated in FIG. 6.

FIG. 6 is a view illustrating a state in which the busbar and the stator which are components of the motor are connected, and FIG. 7 is a view illustrating a shape of the busbar.

Referring to FIGS. 6 and 7, busbars 600 may be inserted into the busbar connecting parts 142 formed in upper portions of the wings 140. The plurality of busbars 600 may be provided, and material cost may be reduced in comparison to when the busbars 600 are integrally formed. Protrusions 610 connected to the busbar connecting parts 142 may be formed on the busbars 600. A shape of the protrusion 610 may be modified according to a shape of the busbar connecting part 142.

Since the busbar is inserted into the integrated insulator to be used as described above, a process may be simplified and automated.

As described above, the insulator and the motor including the insulator according to one exemplary embodiment of the present invention have been specifically described with reference to the accompanying drawings.

The above description is only an example describing a technological scope of the present invention. Various changes, modifications, and replacements may be made by those skilled in the art without departing from the spirit and scope of the present invention. Therefore, the embodiments disclosed above and in the accompanying drawings should be considered in a descriptive sense only and not for limiting the technological scope. The technological scope of the present invention is not limited by the embodiments and the accompanying drawings. The spirit and scope of the present invention should be interpreted by the appended claims and encompass all equivalents falling within the scope of the appended claims.

| Reference Numerals | |
|---|---|
| 1: MOTOR | 100: INSULATOR |
| 110: INNER GUIDE | 120: OUTER GUIDE |
| 122: GUIDE GROOVE | 130: BODY |
| 132: ALIGNMENT GROOVE | 140: WING |
| 142: BUSBAR CONNECTING PART | 150: CONNECTING PART |
| 200: STATOR | 300: COIL |
| 400: ROTOR | 500: ROTATIONAL SHAFT |
| 600: BUSBAR | 610: PROTRUSION |

The invention claimed is:

1. A motor comprising:
a stator on which a coil is wound;
a rotor disposed inside the stator;
a rotational shaft coupled to the rotor; and
an insulator located between the coil and the stator and including an outer circumferential surface on which the coil is wound,
wherein the insulator includes an inner guide, an outer guide, a body which connects the inner guide and the outer guide and on which the coil is wound, and a wing rotatably connected to an outer surface of the outer guide, and
a plurality of guide grooves for guiding the coil are disposed on the outer surface of the outer guide.

2. The motor of claim 1, wherein the wing and another wing adjacent to the wing are connected by a connecting part.

3. The motor of claim 2, wherein the plurality of wings and the connecting part are integrally injection-molded.

4. The motor of claim 3, wherein a notch is formed in the connecting part.

5. The motor of claim 3, wherein a height of the connecting part is smaller than that of the wing.

6. The motor of claim 1, wherein the wing has a height enough to cover the plurality of guide grooves.

7. The motor of claim 1, wherein a busbar connecting part connected to a busbar may be formed on the wing.

8. The motor of claim 7, wherein the busbar connecting part includes a groove into which the busbar is inserted.

9. The insulator motor of claim 3, wherein a busbar connecting part is formed on at least one of the plurality of wings.

10. The motor of claim 9, wherein, among the plurality of the wings, a thickness of the wing in which the busbar connecting part is formed is greater than that of the wing in which the busbar connecting part is not formed.

11. The motor of claim 1, wherein the outer guide and another outer guide adjacent to the outer guide are connected by a connecting part.

12. The motor of claim 11, wherein a notch is formed in the connecting part.

* * * * *